United States Patent [19]

Walker et al.

[11] Patent Number: 4,696,110

[45] Date of Patent: Sep. 29, 1987

[54] PIPEFITTERS TAPE MEASURE

[75] Inventors: Don W. Walker; Lynn Rush, both of Santa Fe, Tex.

[73] Assignee: Billy J. Hawkins, Sr., Frienswood, Tex.; a part interest

[21] Appl. No.: 871,889

[22] Filed: Jun. 6, 1986

[51] Int. Cl.[4] .............................................. G01B 3/10
[52] U.S. Cl. ...................................... 33/137 R; 33/494
[58] Field of Search ........................ 33/137 R, 494, 529

[56] References Cited

U.S. PATENT DOCUMENTS

| 66,120 | 6/1867 | Bigelow | 33/494 |
| 924,671 | 6/1909 | Klie | 33/494 |
| 1,081,673 | 12/1913 | Keuffel | 33/137 R |
| 1,387,599 | 8/1921 | Grout | 33/494 |
| 1,643,166 | 9/1927 | Martin | 33/137 R |
| 2,140,714 | 12/1938 | Palmer | 33/494 |
| 2,792,110 | 5/1957 | Wanish | 33/137 R |
| 3,270,421 | 9/1966 | Jones | 33/137 R |
| 4,149,320 | 4/1979 | Troyer et al. | 33/137 R |

Primary Examiner—Richard R. Stearns
Attorney, Agent, or Firm—Harvey B. Jacobson

[57] ABSTRACT

A pipe fitter's tape measuring strip of 25 foot length is marked on one surface thereof with cumulative inch markings along one edge, with information providing take-off charts along the other edge at a leading end of the strip and with cumulative foot and inch markings following the charts along the remainder of the strip length. The opposite surface of the strip is marked with charts providing information of flange sizes related to different pipe sizes.

1 Claim, 2 Drawing Figures

U.S. Patent  Sep. 29, 1987  4,696,110
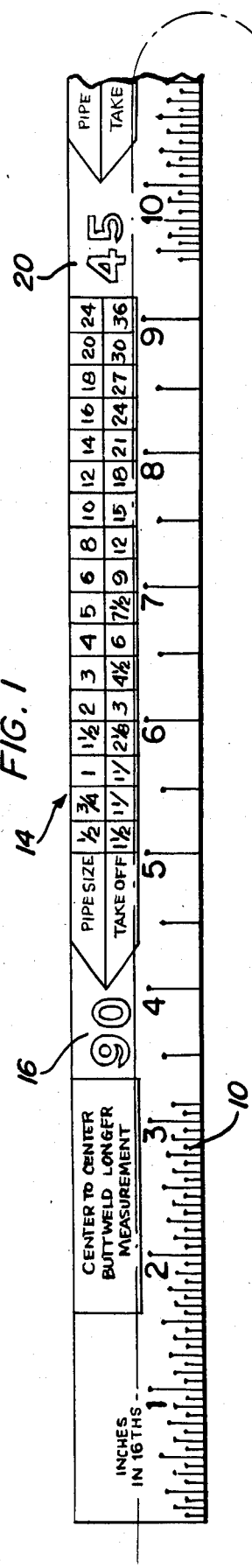
FIG. 1
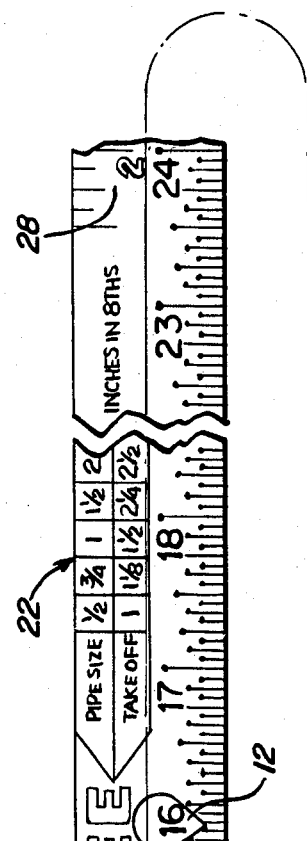
FIG. 2
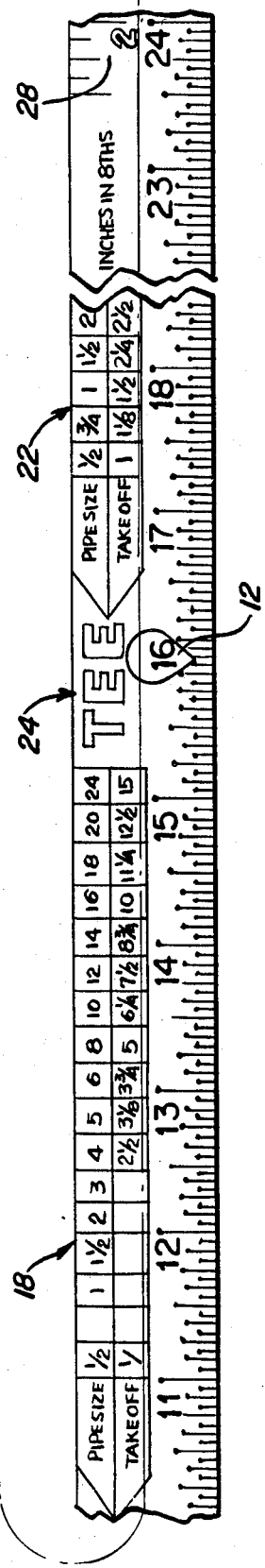

PIPEFITTERS TAPE MEASURE

BACKGROUND AND SUMMARY OF THE INVENTION

This invention relates to a tape measure strip particularly suitable for use by a pipe fitter but which may also be used by other workmen and the like such as boilermakers, welders, layout men, mill rights, and iron workers. Carpenters may also have use for a tape measure strip in accordance with the invention.

The tape measure strip in accordance with the invention is a standard English tape strip laid out in a manner which is easy to read. The strip has aids for the pipe fitter on one surface of the strip with further aids, charts, and the like on the other surface. The strip is a unique item produced with a major activity, namely that of pipe fitting in view. The tape strip may be housed in a conventional housing of the retractable type.

A tape strip in accordance with the invention may for example have a length of 25 feet and may have one surface marked adjacent one edge with first measuring indicia along the entire length of the strip and along an opposite edge adjacent a leading portion of the strip with separate end to end take-off charts extending lengthwise of the strip providing information respectively for different pipe fittings. Said opposite edge of said surface of the strip may also be marked with further measuring indicia along the length of the strip following the charts. The first measuring indicia may include cumulative inch markings along the length of the strip with selected markings at repeated multiple-inch spacings being distinctively marked. The further indicia may include cumulative footage markings at the respective footage intevals and inch markings from one to eleven between each foot marking. The further idicia may also include total footage markings between selected inch marks.

Each take-off chart may comprise an identifying mark at one end thereof, a lengthwise column of pipe size marks, and an adjacent registering column of corresponding take-off marks. The opposite surface of the strip may also be marked with respective charts located end to end and providing information for different size pipe flanges related to different pipe sizes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectionalized face view of a leading portion of one surface of a pipe fitter's strip in accordance with the invention.

FIG. 2 is a face view of part of the opposite surface of the strip.

DESCRIPTION OF PREFERRED EMBODIMENT

A pipe fitter's tape strip in accordance with the invention is, for example, 25 foot long and one inch wide, the strip being made of conventional material and preferably being would on a reel in a conventional type of retractable housing. FIG. 1 of the drawings illustrates the leading portion of one surface of the strip and FIG. 2 illustrates a chart marked on the opposite surface of the strip.

Referring firstly to FIG. 1, the strip has standard English measurements marked thereon. Thus, the strip has a first set of indicia, generally indicated at 10 along a lower edge thereof, these indicia being marked along the entire length of the strip in an inch sequence from one through 300 with one-eighth inch markings therebetween. Further, selected inch markings at repetitive multi-inch intervals are distinctively marked as indicated by reference 12. In the illustrated example, the inches are distinctly marked at 16 inch intervals. Along its first two feet of length, the tape strip also has on the first surface a series of end to end printed pipe fitting take-off charts. Thus, a first chart indicated at 14 is for a 90 degree pipe fitting and has an upper column of pipe sizes and a corresponding lower column of take-off marks with an indicator mark 16 at the leading end of the chart. Chart 14 is followed by a similar chart 18 with an indicator mark 20 for 45 degree pipe fittings and this in turn is followed by a further chart 22 with an identifying mark 24 for Tee fittings.

Following the chart 22 along the upper edge of the strip is a further set of indicia generally indicated by reference 26. The further indicia include sequential foot markings starting with a two foot mark 28, the respective foot markings being located at the relative footage intervals, and inch markings 30 from 1 through 11 between the respective foot markings. Further, there are provided additional cumulative foot markings 32 between selected inch markings and preferably between each inch mark.

It is understood that the respective sets of indicia 10 and 26 extend throughout the length of the strip.

The opposite surface of the strip is marked repetitively and sequentially with a series of flange charts such as chart 32 shown in FIG. 2. Each flange chart is for a different flange series for example in numbers 150, 300 and 600 covering pipes of one inch through 24 inches. Each chart shows the respective pipe size, wrench size layout of bolts, their size, stud length of bolts, the gasket inside dimension and outside dimension, the flange diameter, also the ring joint, stud lengths, plus the ring number for each size flange.

Preferably, the most used charts which are generally the number 150 and number 300 will be located at the leading end of the strip.

The foregoing is considered as illutrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pipe fitter's measuring tape strip having a front surface marked adjacent one edge with first measuring indicia along the entire length of the strip, and along an opposite edge adjacent a leading first end portion of the strip with separate end to end take-off charts extending lengthwise of the strip providing information respectively for different pipe fittings, said opposite edge of said front surface being marked with further measuring indicia along a second portion of the length of the strip following the first end portion having said charts thereon, said strip measuring a number of feet in length, said first measuring indicia including cumulative inch markings along the length of the strip with selected inch markings repeated at 16" spaces being distinctively marked, said further indicia including cumulative footage markings at the respective footage intervals, and inch markings from one to eleven between each footage marking, said further indicia markings also including total footage marks between selected inch marks, each of said take-off charts comprising an identifying mark at one end thereof, a lengthwise column of pipe size marks, and an adjacent registering column of corresponding take-off marks, the opposite surface of said strip is marked with respective charts located end-to-end and providing information of different size pipe flanges related to different pipe sizes with the most frequently used charts being located at a leading end portion of the strip.

* * * * *